H. EDMONDS.
STAY FOR LACE AND OTHER SOFT COLLARS.
APPLICATION FILED JULY 9, 1909.
966,893.
Patented Aug. 9, 1910.
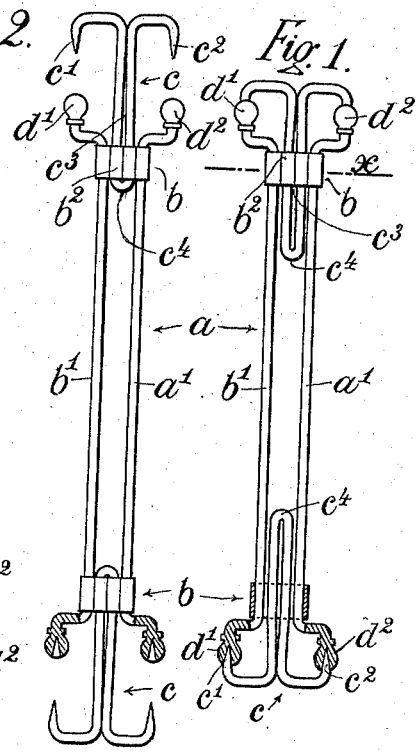

UNITED STATES PATENT OFFICE.

HENRY EDMONDS, OF SOHO HILL, BIRMINGHAM, ENGLAND.

STAY FOR LACE AND OTHER SOFT COLLARS.

966,893.  Specification of Letters Patent. Patented Aug. 9, 1910.

Application filed July 9, 1909. Serial No. 506,809.

*To all whom it may concern:*

Be it known that I, HENRY EDMONDS, a subject of the King of Great Britain, and residing at Soho Hill, Birmingham, England, manufacturer, have invented certain new and useful Improvements in Stays for Lace and other Soft Collars, of which the following is a specification.

This invention has reference to supports or spreader devices for use in connection with lace and other soft collars, neck-bands and the like, as principally worn by ladies; and has for its principal object, to provide an improved support in which the fastenings for engaging the lace or other material of a collar or the like, are permanently secured to the body of the device in such a way that while the same can be readily engaged with and disengaged from the collar or like material, they cannot become detached and lost or mislaid.

Another object of the said invention is to provide means for guiding the fastenings and thereby facilitating their engagement with the said material.

Figure 1 of the accompanying drawings represents one form of the improved support wherein each end of the body is provided with a non-detachable fastening slide, and with means for guiding the said slide and preventing the same from twisting out of line with the said body, whereby its engagement with the material of a collar or the like can be effected with ease and merely by the application of pressure to the end of the device. In this view, the upper portion of the support is shown in elevation and the lower portion in section, while both slides are represented in the fastening positions. Fig. 2 is a similar view to Fig. 1, but the slides are shown in the withdrawn positions in which they have to be placed prior to being engaged with the lace or other material in effecting the connection between the collar and the support. Fig. 3 shows a plan of one end of the device, and Fig. 4 is a horizontal section taken through one of the guides upon the dotted line $x$ Fig. 1. Figs. 5 and 6 are views illustrating the method of engaging the fastening slides with the material of a collar. Fig. 7 shows a soft collar in wear, with its sides being supported or extended by means of the improved device. Fig. 8 shows a modification of the support shown in Figs. 1 to 7. Fig. 9 is another modification which is made entirely from wire. Fig. 10 is a further modification and Fig. 11 is a section thereof on the line $x^1$ of Fig. 10. Fig. 12 is an alternative form of single-pointed slide.

In the arrangement shown in Figs. 1 to 7, the support comprises a body $a$ carrying at each end a guide $b$ for a fastening slide $c$ (which has a pair of pointed hooks or engaging parts $c^1$, $c^2$) and a pair of shields or protectors $d^1$, $d^2$, for the pointed parts of the said slide. The said body consists of two lengths of wire $a^1$, $b^1$, which are connected or tied together laterally, near their ends, by the guides $b$, and which are sufficiently stiff or rigid in the vertical direction to effectively support the collar or keep the material distended, while their extremities are cranked laterally or bent to the form as shown so as to increase the distance between them and are provided with the protector terminals $d^1$, $d^2$, which respectively receive the points of the fastening hooks when the slide is in its fastening position and thereby effectually shield the neck of the wearer against injury by scratching or otherwise. The middle part of each slide consists of a stem $c^3$, which has the hooks arranged in reverse directions on its opposite sides, and is passed through, and is capable of a limited sliding movement within, the sleeve or eye $b^2$ in the middle of the guide, while at its lower end the said stem is enlarged at $c^4$ or provided with some other suitable form of stop which prevents the complete withdrawal of the said stem from the guide and thereby makes the slide non-detachable. The engaging or pointed parts of each slide are arranged so that they lie in line with the corresponding guards or protectors at the terminations of the body, and in order to preserve this alinement, and make the slides self-centering as to their engagement with the collar material and with their guards or point-protectors the stem and its guide sleeve are made of such a section that the former shall be incapable of turning or twisting within the latter. In the arrangement shown in the Figs. 1 to 6, where the slides are made from wire, the stems each consist of a double or folded portion of the wire, and the sleeve or eye is made of a corresponding section, as shown in Fig. 4, but it is to be understood that these parts may be made of any other section that will permit of the extending and shutting down of the non-detachable slides and at the same time prevent the twisting of the points or engaging parts out of alinement. The effect of this arrangement is that when either slide is in the withdrawn position shown in Fig. 2, it can always be engaged with the material of a collar and closed so that its points take into the protectors by the mere application of end pressure to the head of the said slide.

The method of fastening the support to the material of a collar or the like is shown in Figs. 5 and 6, from which it will be seen that when the slide is withdrawn, the edge of the material $e$ is taken around the front of the stem and made to overlap the point protectors and while the said material is being held in this position, end pressure is applied to the said slide so that it is shut down toward the material and its points are guided first through the said material and then into the protectors as shown in dotted lines in Fig. 5, so that the fastening is self-centering as to its proper engagement with the said parts. And when the slides are shut down or closed as described, the point protectors, being overlapped by the perforated portions of the material, serve to keep the latter in engagement with the pointed parts and to render the fastening effective. Preferably also, these point protectors are made spherical or rounded in form so that there is no tendency for the same to tear or damage lace or other delicate material, while when the slides at both ends of the device have been connected to the opposite edges of a collar as above described, the said collar is supported and kept properly distended in a condition for effective wear, although the supports can be readily detached and removed by merely withdrawing the slides.

Fig. 8 shows one end of a slightly modified form of support, which only differs from the arrangement shown in Figs. 1 to 7 in the construction of the non-detachable and self-centering slide; the corresponding parts being marked with the same reference letters as are used in the said Figs. 1 to 7. In this form, the stem of the slide is shown as a single section of wire and the guides for the stem are shown as coils which are formed in the wires $a^1$ $b'$ at their upper ends and from which the terminals $d^1$ $d^2$ are offset.

Fig. 9 shows one end of a support, wherein all the parts are fashioned from wire, including the protectors or shields $d^1$, $d^2$, which are made by coiling the extremities of the body wires as shown.

Fig. 10 shows another modification in which each end of the support is provided with a single-pointed slidable and non-detachable slide $c$, and Fig. 11 is a section taken upon the dotted line $x^1$ through the stem $c^2$ of the said slide and its guide $b$, showing the form which is given to these parts to prevent twisting and keep the point $c^1$ in alinement with the protector terminal $d$ of the body $a$. In this alternative form of the single-pointed slide arrangement, the parts are made from wire and the guide and point protector are made by coiling the body wire $a$, at the parts $b$ and $d$.

Fig. 12 represents a further modification in which the fastening slide consists of a loop or frame $e$, is slidably mounted on the end of the body wire and carries a single point. The slides may be also connected with the body of the device in various other ways which will render them non-detachable and insure that the points of the fastenings shall be self-centering as to their engagement with the collar or other material and with the point protectors when shut home. The body or part of the device whereon the slides are mounted may be constructed in a variety of forms and provision may be made for rendering the same flexible so that they will give to the movements of a wearer's neck when applied to a collar, etc.

Having fully described my invention, what I desire to claim and secure by Letters Patent is:—

A stay of the type set forth comprising a shank formed of two parallel members, each member having a spherical shield projecting from each end thereof and in offset relation thereto, guides connecting the members and having axial channels and a frictionally held slide at each end of the shank and comprising a member which is bent upon itself at a central point and has its bent portions passed through the channels and formed with hook-shaped pointed ends for engagement in the corresponding shields.

In testimony whereof I have hereunto set my hand in presence of two subscribing witnesses.

HENRY EDMONDS.

Witnesses:
HENRY SKERRETT,
HENRY NORTON SKERRETT.